(12) United States Patent
Tanaka et al.

(10) Patent No.: US 8,017,668 B2
(45) Date of Patent: Sep. 13, 2011

(54) COMPOSITION FOR DRY LUBRICANT FILM AND PLAIN BEARING WITH SLIDING LAYER USING THE SAME

(75) Inventors: Takuya Tanaka, Inuyama (JP); Koue Ohkawa, Inuyama (JP); Keiichiro Kume, Inuyama (JP); Yoshimi Kuroda, Inabe (JP); Hideo Kawabata, Inabe (JP)

(73) Assignee: Daido Metal Company Ltd., Nagoya (JP)

( * ) Notice: Subject to any disclaimer, the term of this patent is extended or adjusted under 35 U.S.C. 154(b) by 457 days.

(21) Appl. No.: 12/140,010

(22) Filed: Jun. 16, 2008

(65) Prior Publication Data
US 2008/0312357 A1     Dec. 18, 2008

(30) Foreign Application Priority Data
Jun. 15, 2007    (JP) .................. 2007-158273

(51) Int. Cl.
*C08J 5/14*     (2006.01)
*C08K 3/04*     (2006.01)
*C08K 3/30*     (2006.01)
*F16C 29/02*    (2006.01)

(52) U.S. Cl. .......... 523/149; 524/420; 524/495; 384/29; 384/322

(58) Field of Classification Search .................. 523/149; 524/420, 495; 384/29, 322
See application file for complete search history.

(56) References Cited

U.S. PATENT DOCUMENTS

| | | | | |
|---|---|---|---|---|
| 4,182,382 A | * | 1/1980 | Ingraham | .............. 140/3 R |
| 4,977,213 A | * | 12/1990 | Giroud-Abel et al. | .......... 525/66 |
| 5,962,376 A | | 10/1999 | Yamazaki et al. | |
| 6,316,534 B1 | * | 11/2001 | Shimokusuzono et al. | .. 524/284 |
| 2003/0134141 A1 | * | 7/2003 | Okado et al. | ................. 428/626 |
| 2007/0230846 A1 | | 10/2007 | Tanaka et al. | |

FOREIGN PATENT DOCUMENTS

| | | |
|---|---|---|
| DE | 2818184 A1 | 10/1979 |
| EP | 1489152 A3 | 9/2005 |
| EP | 1813663 A1 | 8/2007 |
| GB | 2384033 A1 | 7/2003 |
| GB | 2435911 A1 | 12/2007 |
| JP | 62010166 | 1/1987 |
| JP | 4-83914 | 3/1992 |
| JP | 9-79262 | 3/1997 |
| JP | 2001343022 | 12/2001 |
| JP | 200356566 | 2/2003 |
| JP | 200419758 | 1/2004 |
| JP | 2007269936 | 10/2007 |

* cited by examiner

*Primary Examiner* — Tae H Yoon
(74) *Attorney, Agent, or Firm* — Browdy and Neimark, PLLC

(57) ABSTRACT

The present invention provides a plain bearing having improved bearing properties, especially anti-seizure property, initial conformability and cavitation resistance. According to the present invention, a sliding layer is provided on a surface of a bearing alloy layer comprising of a copper-based or aluminum-based alloy, thereby the sliding layer is so structured that, to a polyamide-imide resin of a main constituent, a polyamide resin is added and mixed under a high shear force to form a polymer-alloyed resin binder, in which 1 to 75% by mass of a solid lubricant is dispersed. The sliding layer can have high toughness and strength, as well as improved anti-seizure property, initial conformability and cavitation resistance.

9 Claims, 1 Drawing Sheet

COMPOSITION FOR DRY LUBRICANT FILM AND PLAIN BEARING WITH SLIDING LAYER USING THE SAME

BACKGROUND OF THE INVENTION

The present invention relates to a composition for a dry lubricant film and a plain bearing with a sliding layer using the same.

Conventionally a bearing for automobile engines is fabricated by bonded a steel backing plate with a copper-based or aluminum-based bearing alloy. For such plain bearings, to improve wear resistance, anti-seizure property and initial conformability, a sliding layer is formed by coating a surface of a bearing alloy layer with a thermosetting resin, such as a polyamide-imide resin (PAI), a polyimide resin (PI) and an epoxy resin (EP), containing a solid lubricant and the like as disclosed in JP-A-4-83914 (Patent Document 1), JP-A-9-79262 (Patent Document 2), etc. Further, to improve initial wear resistance while maintaining the conformability, a protective layer is formed of a solid lubricant and a binder composed of a thermoplastic resin and a thermosetting resin soluble in a polar solvent as disclosed in JP-A-2001-343022 (Patent Document 3).

There is a known phenomenon that in using a plain bearing, cavities (bubbles) are generated in lubricating oil, which causes as a result erosion on the bearing surface. This is a phenomenon that cavities generated in lubricating oil explode under a higher pressure and energy upon exploding destructs erosively the bearing surface. A conventional countermeasure thereagainst has been to increase the material strength of a sliding layer to enhance cavitation resistance. For example, a sliding layer is constructed with a polybenzoimidazole resin (PBI) containing a solid lubricant to improve wear resistance, anti-seizure property and cavitation resistance according to JP-A-2004-19758 (Patent Document 4). Improvement of a sliding property is tried by a combination of a solid lubricant containing lead and a resin binder of at least one of PAI, PI, EP and PBI as disclosed in JP-A-2003-56566 (Patent Document 5).

Patent Document 1: JP-A-4-83914
Patent Document 2: JP-A-9-79262
Patent Document 3: JP-A-2001-343022 (paragraph 0007)
Patent Document 4: JP-A-2004-19758
Patent Document 5: JP-A-2003-56566.

The disclosures of Patent Documents 1 to 5 have not fully satisfied plain bearing performance (anti-seizure property, initial conformability and cavitation resistance) of higher level of performance and load required by recent high power, high speed internal combustion engines. For example, although Patent Document 5 describes a resin binder prepared by blending PAI, PI, EP and PBI, simple polymer-blending disperses resins in a form of clusters but does not mix the resins compatibly with each other. Consequently, it has a drawback that due to physical property nonuniformity existing in a sliding layer, sufficient anti-seizure property, especially cavitation resistance cannot be attained.

Patent Document 3 describes "a thermosetting resin and a thermoplastic resin are, when dissolved in a solvent, mixed with each other compatibly in an ultra-fine unit close to a molecule . . . come to have intermediate properties", thereby "mixed with each other compatibly" means that a thermosetting resin and a thermoplastic resin form clusters in a solvent, although the cluster sizes are ultra-fine (microclusters). The thermosetting resin and the thermoplastic resin are therefore not mixed with each other compatibly, and the thermoplastic resin is dispersed microscopically in the thermosetting resin to exhibit intermediate properties. It still has a drawback that, when utilized as a sliding layer of a plain bearing to be used under the condition where the cavitation phenomenon should occur, the stress of cavitation concentrates at the boundary surface between the respective resin phases, where continuity of the physical properties is lost, and the cavitation resistance is deteriorated.

The present invention is conducted under the aforementioned circumstances, and an object of the prevent invention is to provide a composition for a dry lubricant film cables of further improving the bearing properties, particularly anti-seizure property, initial conformability and cavitation resistance, and a plain bearing utilizing the composition for a dry lubricant film as a sliding layer.

SUMMARY OF THE INVENTION

The present invention provides a composition for a dry lubricant film and a plain bearing as described below:

(1) A composition for a dry lubricant film comprising a polymer-alloyed resin binder, which is prepared by adding a polyamide resin to a polyamide-imide resin of a main constituent, and mixing the mixture under a high shear force, and 1 to 75% by mass of a solid lubricant dispersed therein.

(2) The composition for a dry lubricant film according to (1) above, wherein the solid lubricant is at least one selected from the group consisting of molybdenum disulfide, polytetrafluoroethylene, graphite and tungsten disulfide.

(3) The composition for a dry lubricant film according to (1) or (2) above, wherein a content of the polyamide resin in 100 parts by weight of the polymer-alloyed resin is 3 to 40 parts by weight.

(4) The composition for a dry lubricant film according to any one of (1) to (3) above, wherein the polyamide resin in the polymer-alloyed resin is any one selected from the group consisting of a polymerized fatty acid polyamide, a polymerized fatty acid polyamide copolymer and a polymerized fatty acid polyamide having a terminal functional group.

(5) The composition for a dry lubricant film according to any one of (1) to (4) above, wherein a glass transition temperature of the polyamide-imide resin is 150 to 350° C.

(6) A plain bearing, wherein a sliding layer on a surface of a bearing alloy layer comprising a copper-based or aluminum-based alloy comprises the composition for a dry lubricant film according to any one of (1) to (5) above.

(7) The plain bearing according to (6) above, wherein the sliding layer has a sliding layer surface roughness (Ra) of 0.5 μm or below.

(8) The plain bearing according to (6) or (7) above, wherein the sliding layer has a sliding layer thickness of 1 to 30 μm.

In order to achieve the aforementioned object, in the aspect (1) above of the present invention, a polymer-alloyed resin binder, which is prepared by adding a polyamide resin to a polyamide-imide resin of a main constituent, and mixing the mixture under a high shear force, and 1 to 75% by mass of a solid lubricant dispersed therein are contained.

In the aspect (2) above of the present invention, the solid lubricant is at least one selected from the group consisting of molybdenum disulfide, polytetrafluoroethylene, graphite and tungsten disulfide.

In the aspect (3) above of the present invention, a content of the polyamide resin in 100 parts by weight of the polymer-alloyed resin is 3 to 40 parts by weight.

In the aspect (4) above of the present invention, the polyamide resin in the polymer-alloyed resin is any one selected from the group consisting of a polymerized fatty acid polyamide, a polymerized fatty acid polyamide copolymer and a polymerized fatty acid polyamide having a terminal functional group.

In the aspect (5) above of the present invention, a glass transition temperature of the polyamide-imide resin is 150 to 350° C.

The aspect (6) above of the present invention is characterized by a plain bearing, wherein a sliding layer on a surface of a bearing alloy layer comprising a copper-based or aluminum-based alloy comprises the composition for a dry lubricant film according to any one of the aspects (1) to (5) above.

In the aspect (7) above of the present invention, the sliding layer has a sliding layer surface roughness (Ra) of 0.5 µm or below.

In the aspect (8) above of the present invention, the sliding layer has a sliding layer thickness of 1 to 30 µm.

Figure 1:
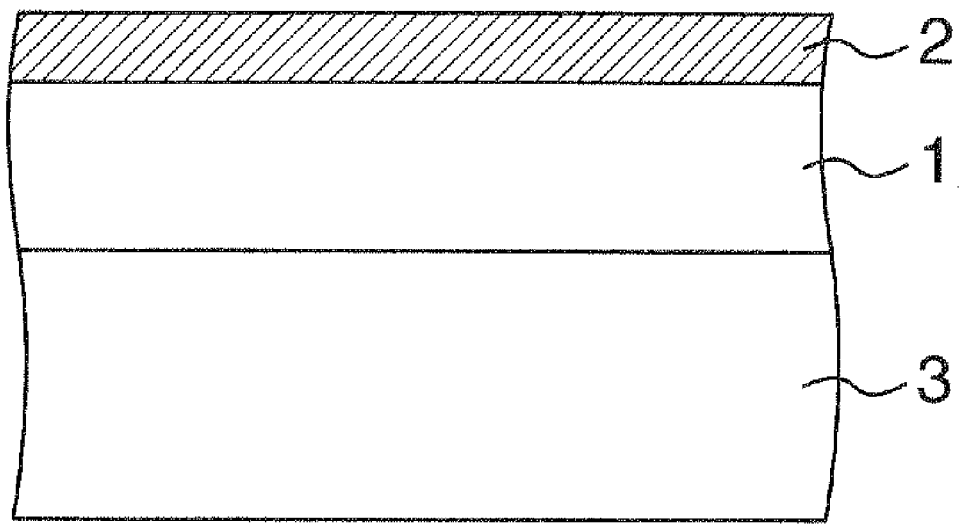
FIG. 1 is a cross-sectional view of a plain bearing in an embodiment of the present invention.

DESCRIPTION OF REFERENCE NUMERALS 1 bearing alloy layer
2 sliding layer
3 steel backing plate

DETAILED DESCRIPTION OF THE INVENTION

The polyamide-imide resin (hereinafter referred to as "PAI"), which is a main constituent of the sliding layer in the aspect (1) of the present invention, is among various thermosetting resins superior in heat resistance and also in material strength, so that wear resistance can be improved. Further, it can maintain a good wear resistance by sliding at an elevated temperature, because deterioration of material strength in a high temperature atmosphere or by a heat generated by sliding is minimal. Further, by adding a polyamide resin (hereinafter referred to as "PA") to PAI, and mixing under a high shear force for polymer-alloying, the toughness and strength of the sliding layer are intensified, and the improved sliding property of the resin binder itself decreases heat generation during sliding, which improves anti-seizure property, initial conformability and cavitation resistance. Before polymer-alloying, polymer molecules of PAI and PA are respectively in the entangled state. By a usual blending procedure such entanglement of polymer molecules cannot be disentangled completely, and the resins are not mixed compatibly with each other. The resins can be mixed compatibly by mixing under a high shear force, which disentangles the polymer molecule entanglement.

Since the sliding layer contains a solid lubricant, its coefficient of friction can be decreased and the anti-seizure property can be increased. In this case, the content of the solid lubricant below 1% by mass does not substantially improve the lubrication, and the content beyond 75% by mass decreases the cavitation resistance. Consequently a preferable content of the solid lubricant is 1 to 75% by mass.

As in the aspect (2) above, the solid lubricant is preferably at least one selected from the group of molybdenum disulfide, polytetrafluoroethylene (hereinafter referred to as "PTFE"), graphite and tungsten disulfide.

Since PA contributes to improvement of the toughness of the sliding layer, addition of PA to the sliding layer can improve conformability and cavitation resistance. Thereby, as in the aspect of (3) above, the increase of initial conformability and cavitation resistance is more significant with a PA content of 3 to 40% by mass.

As in the aspect of (4) above, any one selected from the group consisting of a polymerized fatty acid polyamide, a polymerized fatty acid polyamide copolymer and a polymerized fatty acid polyamide having a terminal functional group is preferably used as PA. PA, also called Nylon, is a generic name for polymers formed by amide bonds, typically having a straight-chain aliphatic polyamide structure, synthesized from various monomers. In addition to a straight-chain aliphatic polyamide, which is obtained by polymerization of lactam or aminocarboxylic acid, or polymerization between diamine and dicarboxylic acid, an amorphous transparent aromatic polyamide, a mixture with a modified polyolefin, a grafted polyamide and a polyamide elastomer with a soft segment of polyether or polyester, are known.

A polyamide has a crystal structure having amide groups in the molecule at a constant interval forming hydrogen bonds. The degree of crystallinity and the size of crystals influence greatly mechanical properties, and an increase of the degree of crystallinity tends to increase strength and rigidity. The polyamide to be used in the present invention is preferably flexible, and therefore preferable is a low crystallinity straight-chain aliphatic polyamide, such as Nylon 12, Nylon 6 and Nylon 6,6. Further preferable are a polymerized fatty acid polyamide, a polymerized fatty acid polyamide copolymer and a polymerized fatty acid polyamide having a terminal functional group, which have high toughness and flexibility due to low crystallinity. Examples of PA to be used in the present invention include: Fine Resin FR-101, 104, 105 and 301 (Namariichi Co., Ltd.), and Rheomide S-2310, 2600, 4500, 6500 and 6800 (Kao Corp.).

As in the aspect of (5) above, the glass transition temperature of PAI is preferably 150 to 350° C. PAI is a polymer having amide bonds introduced in the main chain of a polyimide resin, has a high heat resistance next to polyimide, is thermoformable, and is superior in mechanical strength, chemical resistance, electrical properties and sliding properties, and is therefore a resin utilized as a molding material and a heat resistant paint. The polyamide-imide resin preferable for use in the present invention is a resin with little decrease in material strength at high temperatures and having a glass transition temperature of 150 to 350° C., more preferably 250 to 350° C. Examples of PAI to be used in the present invention include: Vylomax HR11NN, HR12N2, HR13NX, HR14ET, HR15ET and HR16NN (Toyobo Co., Ltd.).

As in the aspect (6) above, by providing the surface of a plain bearing with a sliding layer comprising the aforementioned composition for a dry lubricant film, the initial conformability and the anti-seizure property of the plain bearing are improved further.

Further, if the sliding layer surface roughness of the sliding layer is high, failure of an oil film can take place easily, which easily leads to direct contact of the sliding layer surface with a corresponding shaft, and to seizure by friction heat generation. If the sliding layer surface roughness (Ra) in an initial sliding stage is not 0.5 µm or below as in the aspect (7) above, when an oil film failure takes place, the direct contact of the sliding layer surface with a corresponding shaft occurs and the sliding layer surface will be abraded immediately to a smoother surface. This will supply oil to the sliding layer surface to form an oil film easily suppressing seizuring. If the sliding layer surface roughness (Ra) is beyond 0.5 µm in the initial stage of sliding, when direct contact of the sliding layer surface with a corresponding shaft occurs, apices of the rough surface of the sliding layer will be abraded, but the roughness of the sliding layer surface remains as it is even after such abrasion due to high initial roughness, and difficulty in oil supply continues without improving the anti-seizure property.

As in a case of a bearing for an internal combustion engine, where flexion or vibration of the corresponding shaft can occur, local contact of the sliding layer with the corresponding shaft can easily take place. In such event, plastic deformation, elastic deformation or abrasion of the sliding layer at a local contact will suppress the increase of a local load and thus the decreasing of the material strength of the sliding layer due to heat generation is suppressed to prevent seizuring. To suppress the increase of a local load, the thickness of the sliding layer is preferably 1 to 30 μm, as in the aspect (8) above. In case of a conventional sliding layer, the decrease of the material strength by heat generation by friction is severe and the sliding layer itself tends to disappear from the sliding surface, and it is therefore difficult to make the thickness of the sliding layer 3 μm or less. According to the present invention, the sliding property of the resin binder is improved by polymer-alloying of PAI and PA, the heat generation is less than that of the base resin of PAI alone, and the sliding layer, even with a thickness of 1 to 3 μm, will not disappear easily from the sliding surface, and suppress sufficiently the increase of a local load, thus preventing the decrease of the anti-seizure property.

An embodiment of the present invention will now be described. FIG. 1 is a cross-sectional view of a plain bearing schematically illustrating an embodiment of the present invention. The plain bearing is so constructed that on the surface of a steel backing plate 3 a bearing alloy layer 1 composed of a copper-based or aluminum-based alloy is lined, on which surface a sliding layer 2 is provided. In the present embodiment, the sliding layer 2 is a sliding layer containing a resin binder formed by polymer-alloying the mixture of PAI as the main constituent of the resin binder and PA, and 1 to 75% by mass of a solid lubricant. Examples of the usable solid lubricant include: molybdenum disulfide ($MoS_2$), polytetrafluoroethylene (PTFE), graphite (Gr), tungsten disulfide ($WS_2$) and boron nitride (BN). The sliding layer may further contain hard particles and a soft metal, as required. Examples of the usable hard particles include: a nitride, such as silicon nitride ($Si_3N_4$), an oxide, such as aluminum oxide ($Al_2O_3$), silicon oxide ($SiO_2$) and titanium oxide ($TiO_2$), a carbide, such as silicon carbide (SiC). Examples of the usable soft metal include: copper, silver, gold, aluminum, tin, zinc, bismuth and an alloy thereof.

A seizure test and a cavitation resistance test were conducted on Example samples with a sliding layer according to the present Example and Comparative Example samples with a conventional sliding layer. The results are shown in Table 1. To prepare an Example sample, on a backing steel plate a copper-based bearing alloy layer was bonded, the sample was processed to a flat plate, degreased, and the surface of the bearing alloy layer was roughened by blasting. The compositions of Examples 1 to 11 listed in Table 1 were diluted by organic solvents (N-methyl-2-pyrrolidone, xylene and ethanol), to which a high shear force was applied by a homogenizer for a long time (1 hour or longer) to prepare mixed compatibly and homogenized compositions. The sample was washed with an acid, washed with warm water, dried and the prepared composition was air-sprayed over the surface of the bearing alloy layer. The sample was dried to remove the organic solvents and cured at 250° C. for 60 min. The thickness of a sliding layer was for both the seizure test and the cavitation resistance test 5 μm in Examples 1 to 8, and 2 μm in Examples 9 to 11. The compositions were polymer-alloyed by application of a high shear force with a homogenizer. In order to confirm the polymer-alloying, the sample was prepared after coating to reveal a section for observation, then washed with a solvent that dissolves only clusters of PA (e.g. ethanol), and examined for the existence of hollows formed by the dissolution with an electron microscope (SEM) at a magnification of 1000.

On the other hand, to prepare a Comparative Example sample, on a backing steel plate a copper-based bearing alloy layer was bonded, the sample was processed to a flat plate and degreased, and then the surface of the bearing alloy layer was roughened by blasting. The compositions of Comparative Examples 1 to 6 listed in Table 1 were diluted by organic solvents (N-methyl-2-pyrrolidone and xylene), to which a high shear force was applied by a homogenizer to prepare mixed compatibly and homogenized compositions. The sample was washed with an acid, washed with warm water, and dried, and the prepared composition was air-sprayed over the surface of the bearing alloy layer. The sample was dried to remove the organic solvents and cured at 250° C. for 60 min. The thickness of a sliding layer was for both the seizure test and the cavitation resistance test 5 μm. In Comparative Examples 1 to 6, the compositions were polymer-alloyed by application of a high shear force with the homogenizer. In Comparative Example 7 a composition equivalent to Example 6 was mixed with an ultrasonic mixer, which was then air-sprayed over the surface of the bearing alloy layer. The sample was dried to remove the organic solvents and cured at 250° C. for 60 min. The thickness of the sliding layer was for both the seizure test and the cavitation resistance test 5 μm.

TABLE 1

Chemical Compositions and Seizure/Cavitation Test Results

| | | Solid lubricant content in composition (% by mass) | | | Polyamid resin content in polymer-alloyed resin | Content of respective resins in composition (% by mass) | | Seizure load | Volume loss |
|---|---|---|---|---|---|---|---|---|---|
| | | $MoS_2$ | Gr | PTFE | (mass %) | PAI | PA | MPa | mm³ |
| Comparative Example | 1 | 17 | | | 0 | 83 | | 18 | 1.24 |
| | 2 | 72 | | | 0 | 28 | | 21 | 1.40 |
| | 3 | 90 | | | 40 | 6 | 4 | 24 | 1.52 |
| | 4 | | 75 | | 0 | 25 | | 9 | 1.57 |
| | 5 | | | 31 | 0 | 69 | | 9 | 1.36 |
| | 6 | | | | 40 | 60 | 40 | 9 | 0.70 |
| | 7 | 55 | | | 40 | 27 | 18 | 18 | 1.07 |

TABLE 1-continued

Chemical Compositions and Seizure/Cavitation Test Results

| | | Solid lubricant content in composition (% by mass) | | | Polyamid resin content in polymer-alloyed resin (mass %) | Content of respective resins in composition (% by mass) | | Seizure load MPa | Volume loss mm³ |
|---|---|---|---|---|---|---|---|---|---|
| | | MoS₂ | Gr | PTFE | | PAI | PA | | |
| Example | 1 | 72 | | | 2 | 27.5 | 0.5 | 27 | 0.97 |
| | 2 | 72 | | | 4 | 27 | 1 | 30 | 0.89 |
| | 3 | 72 | | | 39 | 17 | 11 | 30 | 0.83 |
| | 4 | 72 | | | 43 | 16 | 12 | 27 | 0.79 |
| | 5 | 1 | | | 40 | 59 | 40 | 24 | 0.72 |
| | 6 | 55 | | | 40 | 27 | 18 | 27 | 0.80 |
| | 7 | | 75 | | 40 | 15 | 10 | 24 | 1.00 |
| | 8 | | | 31 | 40 | 41 | 28 | 27 | 0.99 |
| | 9 | 72 | | | 39 | 17 | 11 | 33 | 0.65 |
| | 10 | 1 | | | 40 | 59 | 40 | 30 | 0.58 |
| | 11 | | | 31 | 40 | 41 | 28 | 30 | 0.60 |

The seizure test was conducted with a ring on disk tester under the testing conditions of Table 2 by increasing the bearing surface pressure by 3 MPa at 30 min intervals, and the friction torque and the seizure load were measured. The seizure load was determined as the contact pressure, when the backside temperature of the bearing exceeded 200° C., or the friction torque was 392 N·m or higher. The cavitation resistance test was conducted with a tester utilizing ultrasonic wave under the testing conditions of Table 3 to measure the weight loss of the sliding layer. The weight loss was converted to volume to obtain the volume loss.

TABLE 2

Conditions for Seizure Test

| Item | Testing conditions | Unit |
|---|---|---|
| Size of specimen | Outer diameter 27.2 × inner diameter 22.0 × thickness 1.6 | mm |
| Peripheral velocity | 2 | m/s |
| Contact pressure | Increase by 3 MPa at 30 min intervals | — |
| Lubricant | SAE#30 | — |
| Lubricant temperature | 60 | ° C. |
| Method of lubrication | Oil dripping | — |
| Axle material | S55C | — |
| Roughness | 0.25 | Ra μm |
| Hardness | 500~700 | Hv10 |

TABLE 3

Conditions for Cavitation Test

| Item | Testing conditions | Unit |
|---|---|---|
| Size of specimen | 50 × 50 | mm |
| Ultrasonic oscillator | | |
| 1. Frequency | 19000 | Hz |
| 2. Power | 600 | W |
| 3. Lubricant | Water | — |
| 4. Lubricant temperature | Room temperature | — |
| 5. Clearance | 0.5 | mm |
| 6. Diameter of horn | 20 | mm |
| 7. Test duration | 2 | min. |

In Table 1, the numericals for the respective components of the sliding layer are expressed in % by mass. In Comparative Example 2, the base resin for the sliding layer was composed of PAI alone, which is different from those in Examples 1, 2, 3 and 4 where PAI and PA formed a polymer-alloy. According to the test results, the seizure load and the cavitation resistance in Examples 1, 2, 3 and 4 are superior. This is attributed to the fact that by mixing PA with PAI forming a polymer-alloy, toughness is increased, which improves initial conformability and anti-seizure property, and suppresses erosion caused by cavitation.

Comparison of Comparative Example 3 with Example 3 shows that Example 3 is superior in terms of seizure load and volume loss. This is attributed to the fact that in Comparative Example 3, the strength of the sliding layer is lowered due to too high content of the solid lubricant beyond 75% by mass, which causes deterioration of seizure load and cavitation resistance.

Comparison of Comparative Example 6 with Example 5 shows that while their volume losses are substantially the same, Example 5 is superior in terms of seizure load. This is attributed to the fact that in Comparative Example 6, the sliding property is not good enough due to its low content of a solid lubricant below 1% by mass, and the initial conformability is poorly available due to insufficient toughness of the sliding layer. Consequently, the content of the solid lubricant is preferably in the range of 1 to 75% by mass.

Comparison of Comparative Example 7 with Example 6 shows that Example 6 is superior in terms of seizure load and volume loss. This is attributed to the fact that in Comparative Example 7, the resins form micro-clusters instead of a uniform material, although the resins are dissolved in a solvent and mixed in microscopic unites near molecular size, and the stress caused by cavitation concentrates at the boundary surface between the resin phases, where the physical properties discontinue (or the strength decreases), to lower the cavitation resistance.

On the contrary, in Example 6, a high shear force is applied during mixing to make PAI and PA exist as single molecules, so that the resins are mixed with each other compatibly to form a single material of a polymer alloy without forming a discontinuity in the resin binder, which increases the cavitation resistance.

In Examples 2 and 3, in which the content of PA in the polymer-alloyed resin binder is 3 to 40% by mass, the anti-seizure property is especially good.

Comparisons of Example 3 with Example 9, Example 5 with Example 10, and Example 8 with Example 11 show that Examples 9, 10 and 11 are superior in terms of seizure load and volume loss. This is attributed to the fact that owing to improvement of the sliding property of the resin binder by polymer-alloying PAI and PA, the heat generation is less than that with a base resin made of PAI alone, and the thickness of the sliding layer can be as thin as 1 to 3 µm without a risk of disappearing easily from the sliding surface, which increases heat dissipation, and the anti-seizure property is improved. Although the test results about the sliding layer containing dispersed tungsten disulfide as a solid lubricant are not shown in Table 1, the present inventors have conducted similar tests for the sliding layer containing dispersed tungsten disulfide, and confirmed substantially the same results as in Examples 1 to 11.

The present invention is not limited to Examples as aforedescribed or illustrated in Figure, and can be modified or extended as described below. An apparatus to apply a shear force to a resin composition is not limited to a homogenizer, but also a high-pressure jet mixer, etc. can be used. As a method for roughening the surface of the bearing alloy layer, etching, thermal spraying and chemical conversion coating can be also utilized in addition to blasting. As a method for applying a resin surface layer or an adhesive layer, pad printing, screen printing and roll coating can be also utilized in addition to air-spraying. Further, the plain bearing can be prepared by fabrication to a form of a plain bearing after providing the sliding layer 2 on the bearing alloy layer 1. The plain bearing according to the present invention can be utilized for a use other than automobile engines, namely with a bearing alloy other than copper-based or aluminum-based alloy. For example, it can be used for a compressor. Further, the plain bearing according to the present invention can be used not only under fluid film lubrication, but also under boundary lubrication or non-lubrication.

The invention claimed is:

1. A composition for a dry lubricant film comprising
a polymer-alloyed resin binder together with 1 to 75% by mass of a solid lubricant dispersed therein,
wherein a major constituent of the polymer-alloyed resin binder is a polyamide-imide resin, and
a minor constituent of the polymer-alloyed resin binder is a polyamide resin in an amount of 2-43 by mass based on 100% by mass of the polymer-alloyed resin binder,
whereby the polyamide-imide resin is formed of a single material of a polymer alloy with no discontinuity in the resin binder.

2. The composition for a dry lubricant film according to claim 1, wherein the solid lubricant is at least one selected from the group consisting of molybdenum disulfide, polytetrafluoroethylene, graphite and tungsten disulfide.

3. The composition for a dry lubricant film according to claim 1, wherein the content of the polyamide resin in the polymer-alloyed resin binder is 3 to 40% by mass.

4. The composition for a dry lubricant film according to claim 1 wherein the polyamide resin in the polymer-alloyed resin binder is any one selected from the group consisting of a polymerized fatty acid polyamide, a polymerized fatty acid polyamide copolymer and a polymerized fatty acid polyamide having a terminal functional group.

5. The composition for a dry lubricant film according to claim 1, wherein a glass transition temperature of the polyamide-imide resin is 150 to 350° C.

6. A plain bearing comprising a bearing alloy layer comprising a copper-based or aluminum-based alloy having a sliding layer on a surface thereof, which sliding layer comprises a composition for a dry lubricant film according to claim 1.

7. The plain bearing according to claim 6, wherein the sliding layer has a sliding layer surface roughness (Ra) of 0.5 µm or below.

8. The plain bearing according to claim 6, wherein the sliding layer has a sliding layer thickness of 1 to 30 µm.

9. A dry lubricant film for a bearing alloy layer of a plain bearing having a sliding layer, comprising
a polymer-alloyed resin binder together with 1 to 75% by mass of a solid lubricant dispersed therein,
wherein a major constituent of the polymer-alloyed resin binder is a polyamide-imide resin, and a minor constituent of the polymer-alloyed resin binder is a polyamide resin,
the polymer-alloyed resin binder comprises a homogenous blend of the polyamide resin and the polyamide-imide resin having been mixed with sufficiently high sheer force for a time sufficient to form a homogenized composition, and
wherein said sliding layer exhibits a seizure load of at least 24 MPa and a cavitation resistance measured as a volume loss in $mm^3$ of no greater than 1.00.

* * * * *